Aug. 25, 1970   I. K. MAYS   3,525,257
ROAD ROUGHNESS METER
Filed Dec. 20, 1968   5 Sheets-Sheet 1

INVENTOR
IVAN K. MAYS

BY John C. Stahl

ATTORNEY

Aug. 25, 1970   I. K. MAYS   3,525,257
ROAD ROUGHNESS METER
Filed Dec. 20, 1968   5 Sheets-Sheet 2

INVENTOR
IVAN K. MAYS

BY John C. Stahl

ATTORNEY

Aug. 25, 1970     I. K. MAYS     3,525,257
ROAD ROUGHNESS METER
Filed Dec. 20, 1968     5 Sheets-Sheet 3
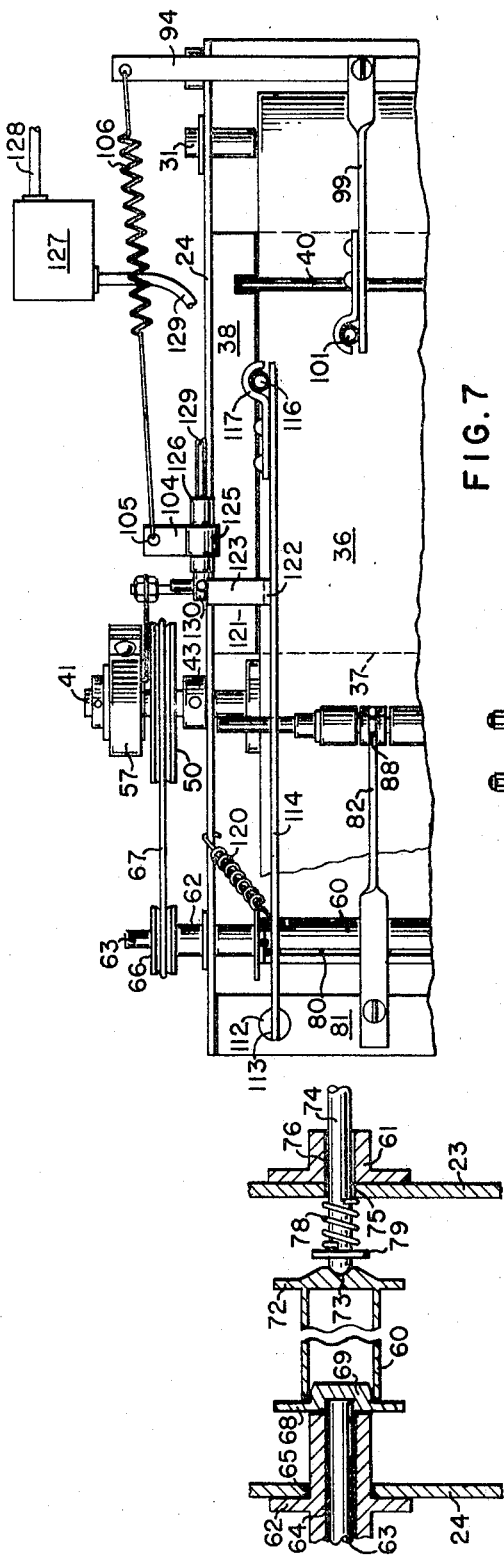
INVENTOR
IVAN K. MAYS
BY *John C. Stahl*
ATTORNEY

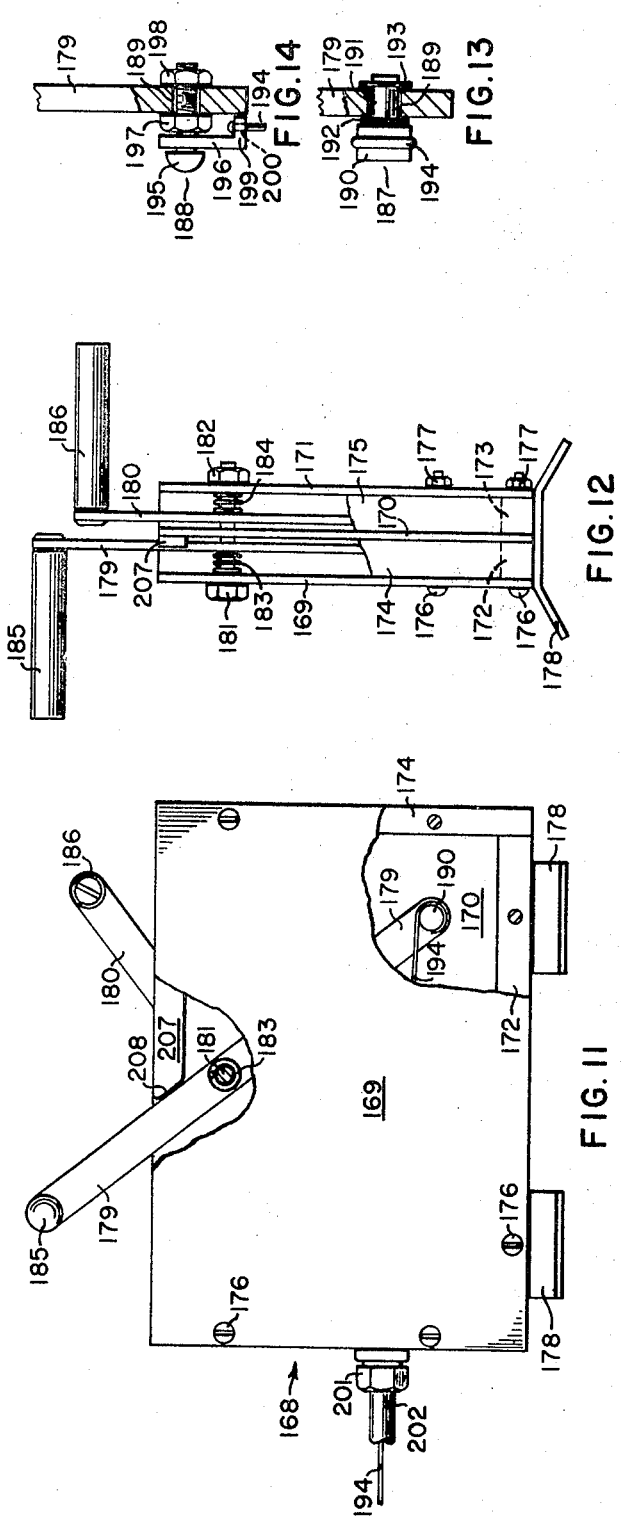

United States Patent Office 3,525,257
Patented Aug. 25, 1970

3,525,257
ROAD ROUGHNESS METER
Ivan K. Mays, 311 Briarwood Trail,
Austin, Tex. 78746
Filed Dec. 20, 1968, Ser. No. 785,699
Int. Cl. G01b 5/28
U.S. Cl. 73—146    9 Claims

ABSTRACT OF THE DISCLOSURE

A road roughness meter mounted in a vehicle and remotely connected to any unsprung portion of said vehicle; forces produced in such unsprung system are applied to a sheave including an indexing clutch which causes a tape to advance and also activates marking means which provides a trace of the frequency and amplitude of such applied forces.

---

The present invention relates to a road roughness meter and more particularly to a roughness meter or profilograph which indicates the relative roughness of pavements.

The importance of evaluating the relative smoothness of pavements is well recognized in highway construction and repair. Roughness measurements provide an objective means of comparing various pavements, the relative performance of various overlay thicknesses, the riding qualities of various cover stones, and a means of evaluating detrimental effects such as heaving soils or pumping pavements.

Equipment for measuring pavement roughness which have heretofore been developed are limited both in accuracy and in the speed with which measurements can be made. In general, the slower equipment gives greater accuracy, however, it is extremely important that such equipment be capable of traveling at 20 m.p.h. or faster; speeds of 45–70 m.p.h. are definitely preferred since these speeds are closer to the current operating speeds on our highways and result in the least danger to personnel handling such equipment.

The primary object of the invention is to provide a road roughness meter which gives a true record of the roughness profile of a road surface, that is, a faithful reproduction of the undulations of the pavement both with respect to frequency and amplitude.

Another object is to provide such a device which includes an event marker whereby a selected portion of a tape may be correlated with a known geographical location.

Still another object is to provide such a device wherein the total distance of road roughness is readily ascertained.

A further object is to provide a summation of the total roughness profile over a selected distance.

A still further object is to provide such a device which is simple in construction, inexpensive to manufacture, and universal in its adaptability.

Other objects and features of the invention will become apparent to those skilled in the art as the disclosure is made in the following detailed description or preferred embodiments of the invention as illustrated in the accompanying sheets of drawing in which:

FIG. 6 is a fragmentary, enlarged, vertical sectional view taken through the takeup spool utilized in FIG. 1.

FIG. 7 is a fragmentary, top plan view of a distance marker in combination with the road roughness meter of FIG. 1.

FIG. 8 is a fragmentary, rear elevational view of FIG. 7.

FIG. 11 is a side elevational view, partly broken away and partly in section, showing a control box which is remotely connected to the road roughness meters of FIGS. 1 and 9.

FIG. 12 is an end view, partly broken away, of FIG. 11.

FIG. 13 is an enlarged view, partly broken away and partly in section, showing the cable connecting means associated with the control box of FIG. 11.

FIG. 14 is an enlarged view, partly broken away and partly in section, of another embodiment of cable connecting means associated with the control box of FIG. 11.

FIG. 15 is a fragmentary view of a tape showing a typical trace provided by the distance marker of FIG. 7.

FIG. 16 is a fragmentary view of a tape showing a typical trace provided by the road roughness meters of FIGS. 1 and 9 of the drawings.

Figure 1:
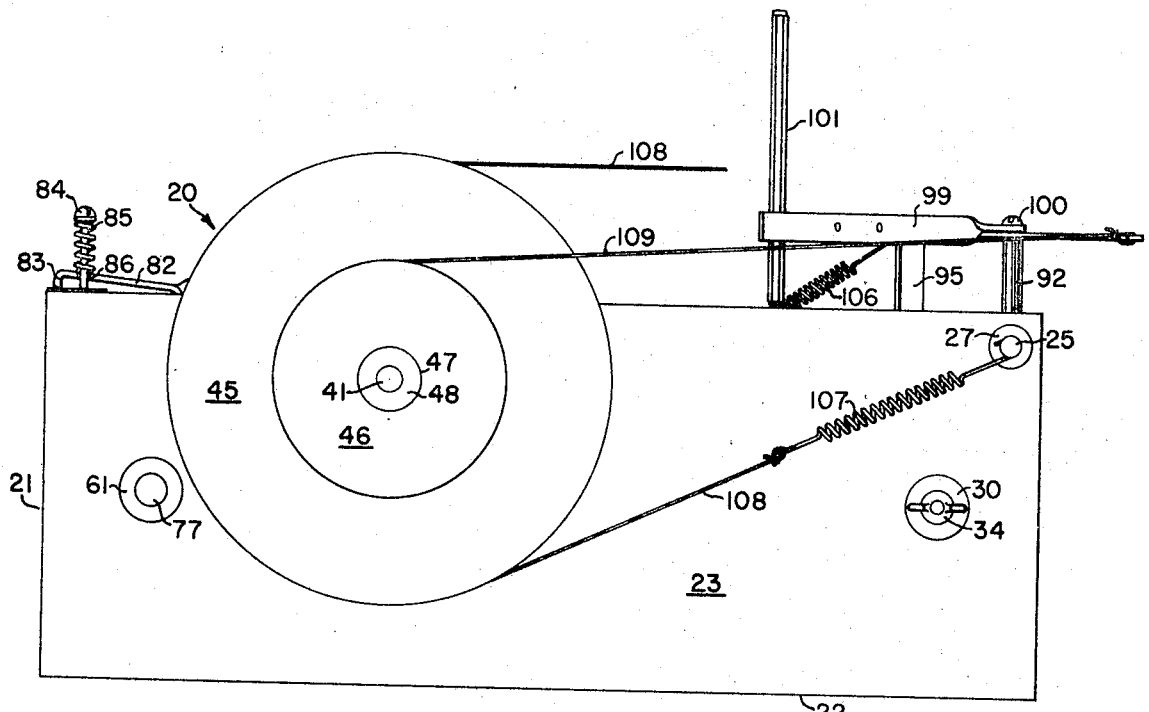
FIG. 1 is a front elevational view of a preferred embodiment of the road roughness meter of the subject invention.

Referring now to the drawings, wherein like reference characters designate like or corresponding parts throughout the several views, there is shown in FIGS. 1–6 a preferred embodiment of the road roughness meter 20 of the subject invention, said meter is mounted at any desired location in a vehicle and remotely connected to any unsprung portion of the said vehicle. More particularly, meter 20 comprises an elongated, essentially U-shaped housing 21 consisting of bottom 22 with spaced and perpendicularly upstanding front and back 23–24, respectively.

Figure 2:
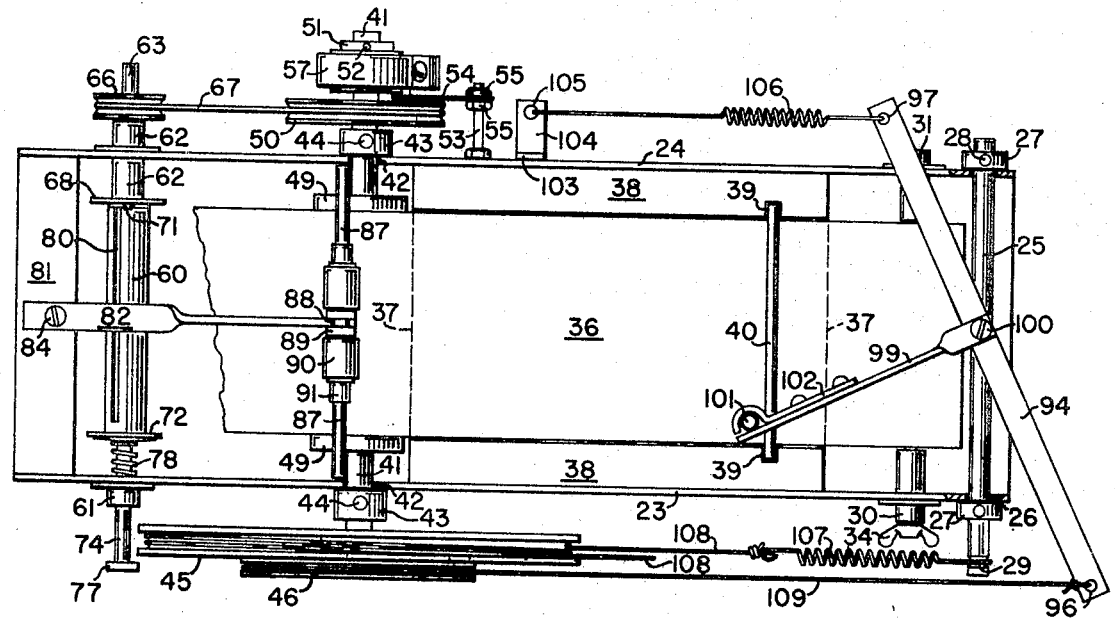
FIG. 2 is a top plan view of FIG. 1.

As best seen in FIGS. 1 and 2 of the drawings, transversely extending rod 25 passes through aligned bores 26 in the upper, right-hand corner of front 23 and the corresponding portion of back 24 with collars 27 secured as by set screws 28 to said rod outwardly of said housing. Annular groove 29 is provided in proximity to the foremost end of rod 25, the purpose of which will hereinafter be described.

Flanged collars 30–31 pass through bores 32 (see FIG. 4) and are conventionally secured to the approximate middle, right-hand end of front 23 with collar 31 aligned therewith and secured to the corresponding portion of back 24. Collar 30 includes an axially extending bore 33 which accommodates bolt 34, said bolt passes through the bore or spool of feed roll 35 and threadingly inserts into collar 31.

Tape 36 from feed roll 35 is drawn angularly upward and passes over horizontally extending platform 37 (see FIG. 3) secured laterally to front 23 and back 24 downwardly of the respective upper edges; longitudinally extending rectangular rails 38 of the same approximate length as platform 37 are conventionally secured in the interior angles formed between such housing and the upper surface of the platform, said rails terminating upwardly in alignment with the upper edges of front 23 and back 24. Aligned, vertically extending slots 39 in the respective rails in proximity to the right-hand ends thereof open inwardly and accommodate the ends of transversely extending rod 40. The opposing rails 38 serve as guides for tape 36 passing over platform 37 while rod 40 bearing against tape 36 aids in maintaining the same flat against the platform.

Transversely extending shaft 41 passes through aligned bores 42 in the upper, left-central portion of front 23 and the corresponding portion of back 24 as viewed in FIGS. 1 and 2 of the drawings. Collars 43 are secured on shaft 41 outwardly of the respective front and back of the housing as by means of set screws 44. Concentric sheaves 45–46 of different diameters are conventionally secured together and include an axial bore 47 in which the outer race of indexing clutch 48 is fixedly secured, said clutch is of the type manufactured by Formsprag Company, of Warren, Mich., and identified as FS–04. The driven race of clutch 48 is secured to shaft 41 forwardly of collar 43. Roller 49 of hard rubber or the like is carried on shaft 41 and is slightly greater in length than the corresponding distance between the inner vertical surfaces of opposing rails 38; the upper surface of said roller is horizontally aligned with the upper surface of platform 37. Tape 36 passes over and partially around the said roller and thence angularly downward.

Sheave 50 is of lesser diameter than sheave 46 and is conventionally secured on shaft 41 rearwardly of collar 43; the inner race of clutch 51 by the manufacturer heretofore mentioned is spaced rearwardly of sheave 50 and secured to shaft 41 as by set screw 52 or the like.

Figure 3:
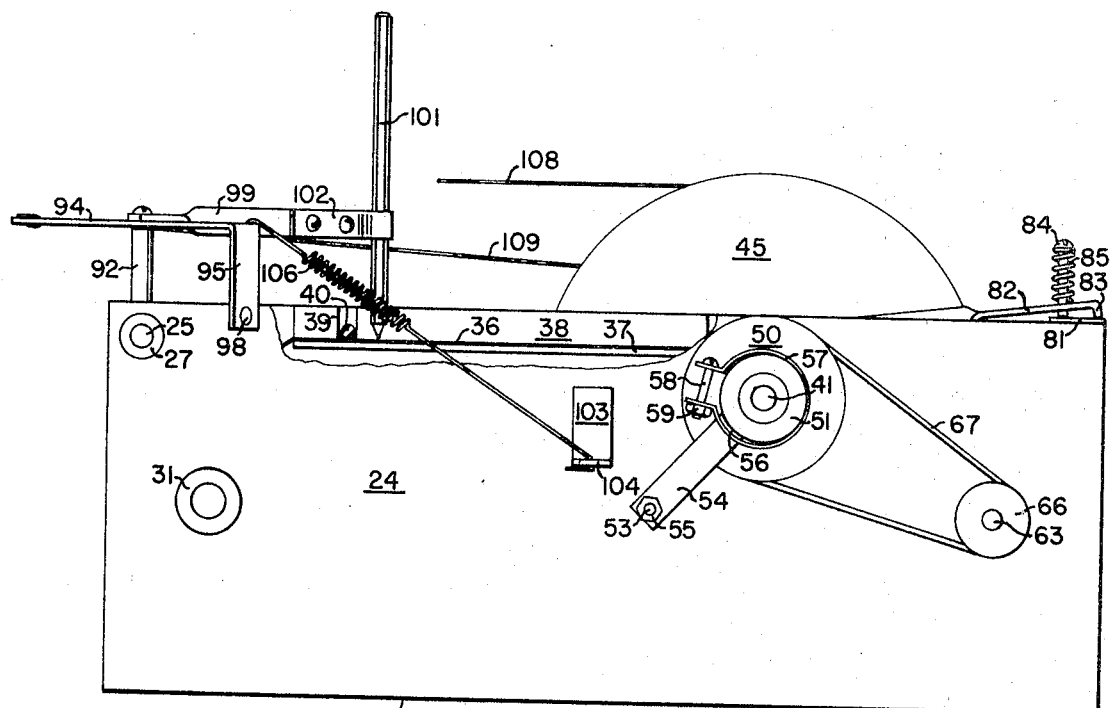
FIG. 3 is a rear elevational view, partly broken away and partly in section, of FIG. 1.

As shown in FIGS. 2 and 3 of the drawings, rearwardly and horizontally extending standoff 53 is fixedly secured at one end to back 24 in proximity to shaft 41. Base 54 of a bracket is secured to standoff 53 as by jam nuts 55 or the like; outturned leg 56 of said bracket abuts the outer race of clutch 51 with pipe band 57 passing outwardly thereof and the ends drawn tight by means of screw 59 and nut 59 whereby the outer race is stationary.

It is to be understood that clutch 51 heretofore mentioned is not required in those embodiments wherein the friction in the axle-tape rolling system is greater than the friction in the indexing-free wheeling system.

Figures 4, 5:
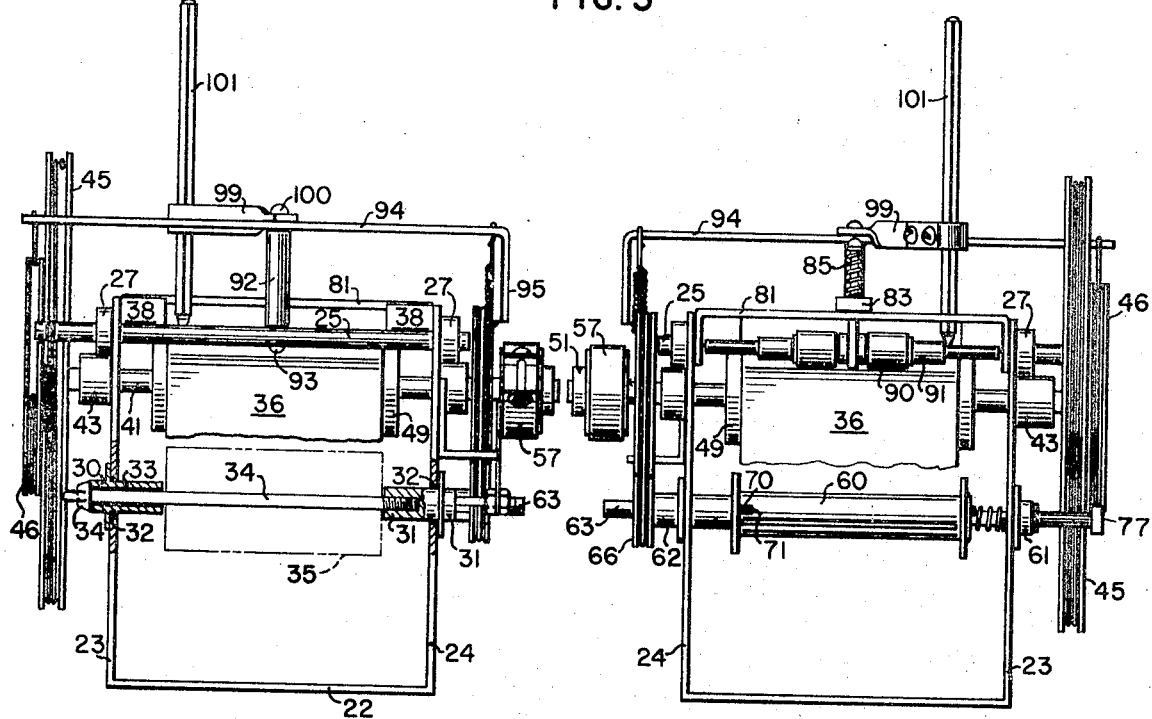
FIG. 4 is a right end view, partly broken away and partly in section, of FIG. 1.
FIG. 5 is a left end view of FIG. 1.

Takeup spool 60 for tape 36 is mounted in the middle, left-hand end of the housing as illustrated in FIGS. 2, 5 and 6 of the drawings; flanged collars 61–62, horizontally aligned with collars 30–31 heretofore mentioned, are secured to front 23 and back 24, respectively. Shaft 63 passes through axial bore 64 in flanged collar 62, said collar is secured in bore 65 in back 24.

Sheave 66 is conventionally secured to shaft 63 rearwardly of flanged collar 62 with belt 67 passed partially around sheaves 50, 66. Disc 68 is fixedly secured to the foremost end of shaft 63; projection 69 adapted to insert into the bore of spool 60 is formed on the inner face of disc 68 with key 70 (see FIG. 5) on such projection inserting into keyway 71 in the end of spool 60 whereby said spool is driven upon rotation of shaft 41 in a manner hereinafter to be described.

The opposite end of spool 60 includes an integrally formed circular end flange 72 with central concavity 73 in the outer surface thereof to receive the rounded end of shaft 74, said shaft passes through bore 75 in front 23, axial bore 76 in collar 61 and terminates outwardly in button 77. Compression spring 78 carried on shaft 74 bears against disc 79 fixedly secured to said shaft and the inner surface of front 23 thereby maintaining spool 60 in position. Transversely extending slot 80 (see FIG. 2) in spool 60 accommodates the end of tape 36, said slot preferably opens rearwardly whereby tape 36 may easily be slipped off spool 60 after use.

Transversely extending member 81 is secured in the upper, left-hand portion of the housing. Longitudinally and medially extending arm 82 terminates at one end in perpendicularly downturned portion 83 which is adapted to bear against member 81. Screw 84 carrying spring 85 passes through vertical bore 86 in arm 82 with said spring bearing thereagainst and threads into a bore in the approximate center of member 81. Arm 82 is bent approximately ninety degrees in proximity to the center thereof whereby the innermost end extends vertically; transversely extending rod 87 passes through horizontal bore 88 in proximity to the outer end of arm 82 with easher 89, roller 90 and securing means 91 carried by the said rod on each side of arm 82. Rollers 90 may be adjusted by rotation of screw 84 to bear against tape 36 forcing the same downwardly against roller 49.

As best seen in FIGS. 1 and 4 of the drawings, standard 92 is rotatably mounted on rod 25 in the approximate center thereof by means of pin 93 or the like. Cross arm 94 terminates rearwardly of back 24 in downturned portion 95, said cross arm includes bores 96–97 in proximity to each end with one or more vertically spaced bores 98 in downturned portion 95. Arm 99 overlies arm 94, is perpendicular thereto and fixedly secured to the approximate center thereof as by machine screw 100 threading into the upper end of standard 92.

Arm 99 is bent vertically whereby pen 101 or other marking device may conveniently be secured to the remote end thereof as by clamp 102 or the like; prior to securing pen 101 the point is adjusted to bear firmly against tape 36 on platform 37 (see FIG. 3).

Leg 103 of a bracket is secured to the upper, approximate center of back 24; perpendicularly rearwardly extending leg 104 of said bracket includes a vertical bore 105. Spring 106 is secured in bores 97, 105 whereby arm 94 is spring biased.

One end of spring 107 is secured in groove 29 heretofore mentioned with cable 108 secured to the opposite end thereof. Cable 108 extends angularly downward, passes in a clockwise direction around sheave 45 at least one complete revolution (see FIG. 2) and then extends horizontally. Henceforth throughout the specification the terms clockwise and counterclockwise are relative to the view of FIG. 1 of the drawings.

Cable 109 is fixedly secured at one end to sheave 46; said cable passes in a clockwise direction around sheave 46 at least twice with the remote end of said cable passing through bore 96 in cross arm 94 and secured thereto.

The invention is not to be restricted to the use of two sheaves 45, 46; the invention also contemplates a single sheave with cables 108, 109 passed in a counterclockwise direction thereabout; preferably spaced and longitudinally extending grooves in the said sheave accommodate cables 108, 109.

As heretofore mentioned, road roughness meter 20 is mounted in any desired location in a vehicle, cable 108 may be passed over any number of pulleys with the remote end of cable 108 secured to any unsprung portion of the said vehicle. Cable 108 is drawn taut and spring 107 partially extended whereby any force produced in the unsprung system is applied to disc 45 and thence to spring 107.

The driving race of indexing clutch 48 is fixedly secured in or to sheaves 45, 46 whereas the driven race of clutch 48, secured to shaft 41, either indexes or free wheels. The outer race of clutch 52 is stationary; the inner race which is secured to shaft 41 may rotate in a counterclockwise direction only and prevents rotation of shaft 41 in a clockwise direction at any time. Accordingly, such construction permits shaft 41 to index or drive in a counterclockwise direction only.

Roller shaft 49 mounted on shaft 41 coacting with rollers 90 advance tape 36 by such indexing action; the end of said tape inserts into slot 80 and is wound on takeup spool 60 in a counterclockwise direction upon rotation of shaft 41.

Cable 109 one end of which is fixedly secured to sheave 46 passes in a clockwise direction around the said sheave at least twice and connects to the foremost end of cross arm 94 thereby causing pen 101 to scribe an arc on tape 36 of the frequency and amplitude of such force, as illustrated in FIG. 16 of the drawings.

At the end of such cycle spring 107 in extended condition causes sheave 45 to rotate in a counterclockwise direction to its neutral position.

When the rear wheel of a vehicle passes over an irregularity in the pavement of a road, such as a bump or convexity, spring 107 causes sheave 45 to rotate in a counterclockwise direction proportional to the amplitude of such applied force and clutch 48 indexes or drives the tape 36 to the left and pen 101 scribes and arc which extends toward back 24; when the rear wheels return to stable condition, sheave 45 rotates in a clockwise direction and indexing clutch 48 is free wheeling. Clutch 51 prevents shaft 41 from rotating in a clockwise direction; tape 36 is stationary and pen 101 scribes an arc extending toward front 23.

When the rear wheels roll into a depression or concavity, sheave 45 rotates in a clockwise direction and clutch 48 is free wheeling; tape 36 is stationary and pen 101 scribes an arc which extends toward front 23 and clutch 51 prevents clockwise rotation of shaft 41. It is evident that when the rear wheels roll out of the said depression the sequence of events are similar to those heretofore described in passing over a convexity.

There is shown in FIGS. 7 and 8 a distance marker which may be utilized in combination with the road roughness meter of the subject invention. Vertical pin 110 is secured downwardly to member 81 in proximity to back 24 of the housing; pin 110 inserts into vertical bore 111 in the lower end of standard 112. Diagonally extending slot 113 in the upper end of standard 112 accommodates one end of elongated arm 114 secured therein as by transverse pin 115. Arm 114 terminates inwardly of the end of arm 99 and pen 116 or other marking device is secured thereto by means of clam 117; the point of pen 116 is adjusted to bear against tape 36. Bore 118 adjacent the upper edge of back 24 intermediate collars 43, 62 and bore 119 in arm 114 accommodate opposite ends of spring 120 whereby arm 114 is biased to back 24 of such housing.

Inverted U-shaped member 121 of spring steel or the like consists of vertically extending leg 122, horizontally and rearwardly extending leg 123, and downturned leg 124 which is approximately vertically aligned with back 24 of the housing. Leg 122 is secured to the rear surface of arm 124 in proximity to pen 116. Leg 103' of a bracket terminates upwardly of the upper edge of back 24 in outturned ring 125 which accommodates bushing 126.

As shown in FIG. 7, gear box 127 of desired gear ratio connects as by means of cable 128 or the like to the odometer of the vehicle. Cable 129 connects at one end to the said gear box 127; the other end passes through bushing 126 with wheel 130 secured outwardly thereof in a conventional manner. Wheel 130 includes one or more radially extending teeth 131; it is understood that when a plurality of teeth are utilized such teeth are equally spaced circumferentially about said wheel. Rotation of wheel 130 results in a selected tooth 131 bearing against the outer surface of leg 124 whereby arm 114 rotates inwardly until such time that said tooth passes downwardly of the lower edge of leg 124 and spring biased arm 114 is immediately pulled rearwardly; pen 116 attached to arm 114 provides a saw toothed trace on tape 36 as illustrated in FIG. 15 of the drawings. It is understood that any desired increment of distance may be provided between adjacent vertical portions of such saw tooth pattern by varying the gear ratio in gear box 127 and/or varying the number of teeth on wheel 130.

Figure 9:
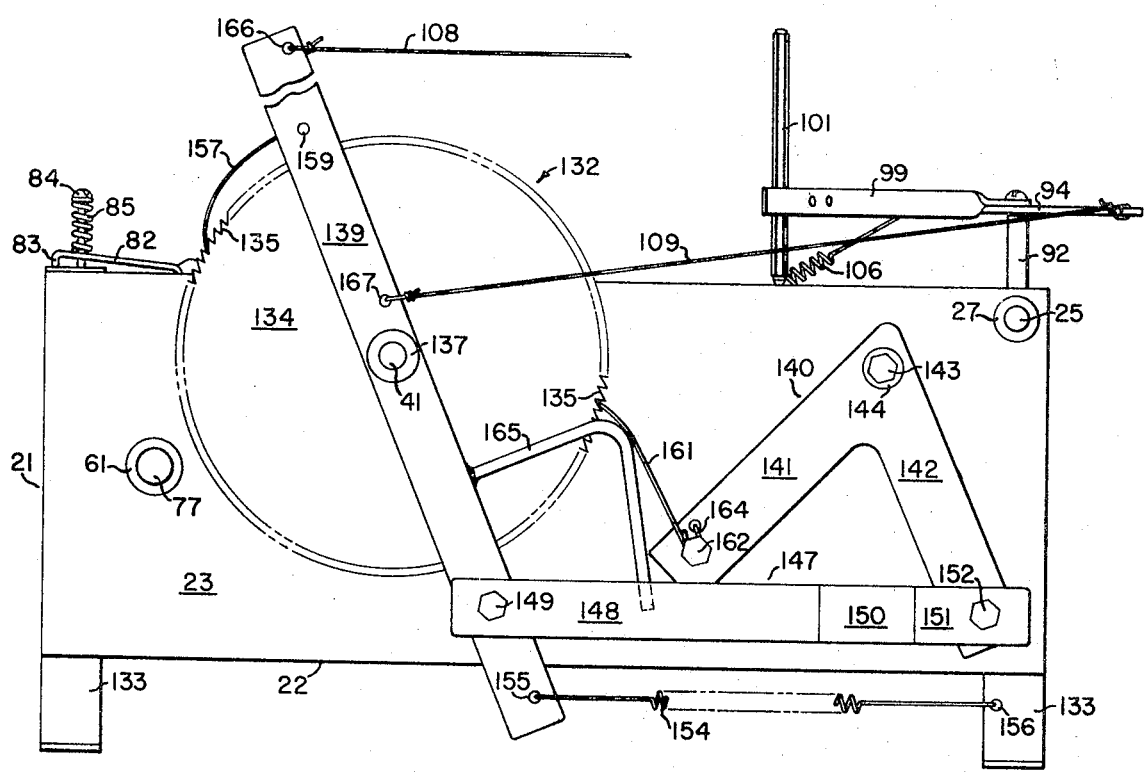
FIG. 9 is a front elevational view of another embodiment of road roughness meter.
Figure 10:
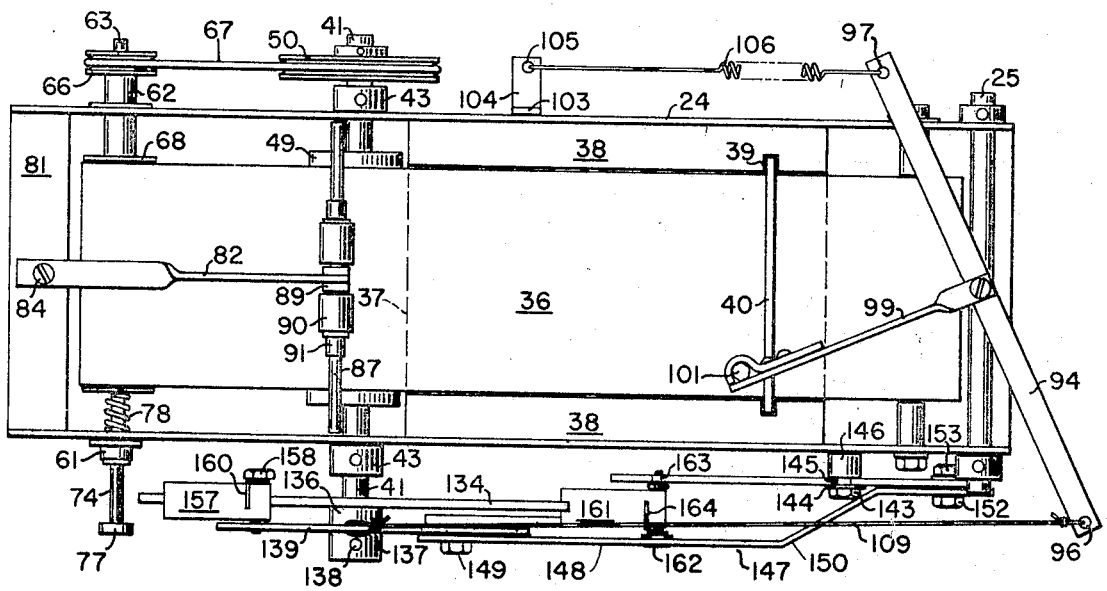
FIG. 10 is a top plan view of FIG. 9.

There is shown in FIGS. 9 and 10 another embodiment of road roughness meter 132 constructed in accordance with the principles of the subject invention. Legs 133 are conventionally secured to bottom 22 of housing 21 adjacent the ends thereof.

Disc 134, including any desired number of equally spaced teeth 135 circumferentially thereabout, is secured outwardly of collar 43 to shaft 41. Bushing 136, rotatably mounted on shaft 41 outwardly of disc 134, is retained by means of collar 137 with set screw 138 adjusted to bear against the said shaft. Diagonally extending arm 139 of greater length than the diameter of disc 134 is secured to bushing 136 in a conventional manner.

Bell crank 140 including angularly depending lever arms 141–142 is pivotally mounted adjacent the upper, right-hand corner of front 23 as by screw 143 carrying washer 144 and passing through bore 145 in said crank and threading into collar 146 fixedly secured to the said front. An elongated and essentially horizontally extending lever arm 147 includes segment 148 the outer end of which is pivotally secured to the lower end of arm 139 by means of bolt 149 passing through aligned bores (not shown) in such parts with a locknut thereon rearwardly of arm 139. Segment 150 is bent angularly inward with segment 151 extending parallel to the plane of segment 148; bolt 152 passes through aligned bores (not shown) in the outer end of segment 151 and lower end of lever arm 142 with locknut 153 threaded thereon rearwardly of arm 142. Spring 154 is secured in bores 155–156 in the lower end of arm 139 and the right-hand leg 133 of the housing, respectively.

As best seen in FIG. 10 of the drawings, arcuately curved and downwardly extending dog 157 is secured in proximity to the upper end of arm 139 as by screw 158 which inserts into threaded portion 159; spring 160 biases the said dog to engage a selected tooth 135 on said disc. Coacting dog 161 is adapted to engage a selected tooth approximately one hundred eighty degrees relative thereto; arcuately curved and upwardly extending dog 161 is secured in proximity to the lower end of lever arm 141 by screw 162 inserting into threaded portion 163 therein; spring 164 conventionally biases dog 161 downwardly. An inverted V-shaped guard 165 is secured at one end to bar 139 downwardly of shaft 41 and aids in repositioning dog 161, if required.

Cable 108 connecting to the unsprung portion of the vehicle in the manner heretofore described is passed through bore 166 in the upper end of arm 139, is drawn taut with spring 154 partially extended. When a force is applied to cable 108 causing arm 139 to rotate in a clockwise direction, for example, lever arm 147 connected thereto applies such resultant force to crank 140 whereby dog 161 engages a selected tooth 135 and rotates disc 134 in a counterclockwise direction whereby tape 36 is advanced. Cable 109 is passed through and secured in bore 167 in arm 139 upwardly of shaft 41, the outer end of the said cable passes through bore 96 in cross arm 94 whereby pen 101 provides a trace in the manner heretofore described.

In the embodiment of FIGS. 9 and 10 of the drawings tape 36 moves to the left regardless of movement of the vehicle body relative to the axle. The vehicle returning to its neutral position coacts with spring 154 and enables arms 139 to return to its neutral position preparatory to further activation; dog 157 prevents rotation of disc 134 and shaft 41 fixedly secured thereto in a clockwise direction.

It is understood that the distance marker of FIGS. 7 and 8 may be used in combination with roughness meter 132 of FIGS. 9 and 10 of the drawings.

Referring now to FIGS. 11–12, there is shown control box 168 which is positioned in proximity to the operator of the vehicle and remotely connected to road roughness meters 20, 132. More specifically, box 168 includes spaced and vertically extending plates 169–171 separated downwardly by longitudinally extending bars 172–173 and at each end by vertically extending bars 174–175; screws 176 are passed through such parts with nuts 177 threaded thereon outwardly of plate 171. Transversely extending mounting legs 178 are conventionally secured to the lower portions of the said box.

Arms 179–180 preferably of equal length are rotatably mounted intermediate plates 169–171 on transversely extending bolt 181 passing through aligned bores in such parts with nut 182 threaded thereon outwardly of plate 171. Spring 183 carried on bolt 181 bears against plate 169 and arm 179 whereas spring 184 carried on the said bolt bears against arm 180 and plate 171, respectively. Arm 179 terminates upwardly in outwardly extending handle 185 while handle 186 is conventionally secured to and extends outwardly of arm 180.

For purposes of convenience only, cable connecting means 187–188 of FIGS. 13–14 will be described in connection with arm 179; it is understood that a mirror image thereof is secured outwardly of the corresponding portion of arm 180.

As shown in FIG. 13, transversely extending bore 189 is provided in proximity to the lower end of arm 179; collar 190 includes reduced shank 191 which terminates outwardly in circumferential groove (not shown). Shank 191 carries washer 192, is passed through bore 189 and retaining ring 193 such as is well known is secured in the said circumferential groove. One end of cable 194, hereinafter to be more fully described, is secured circumferentially about collar 190; such construction permits the said collar to rotate in bore 189.

Connecting means 188 of FIG. 14 comprises bolt 195 which passes through a bore (not shown) in leg 196 of an L-shaped bracket; nut 197 is threaded thereon, said bolt is passed through bore 189 heretofore mentioned with jam nut 198 threaded thereon. Leg 199 of such bracket extends perpendicularly inward and includes bore 200 through which the end of cable 194 is passed and conventionally secured.

Connector 201 secured to one end of box 168 communicates with the chamber formed between plates 169, 170; said connector accommodates one end of tubing 202 the remote end of which terminates in proximity to roughness meters 20, 132. It is understood that a second connector accommodating an end of second tubing connects to the chamber formed between plates 170, 171. Cable 194 passes through tubing 202 and is secured remotely to ring 203 (see FIG. 8). Spring 204 connects to ring 203 and any supporting structure 205, respectively. Jumper cable 206 is slack when meters 20, 132 are operative and is secured to ring 203 and cable 108 heretofore mentioned. When the user pulls rearwardly on handle 185, arm 179 rotates whereby cable 194 secured to the lower end thereof extends spring 204; further rotation of arm 179 causes jumper cable 206 to become taut and any force produced in the unsprung system of the vehicle is effectively isolated from meters 20, 132. Horizontally extending bar 207 terminating in shoulder 208 is secured to the upper side of plate 170 whereby arm 179 may be secured in such disengaged position.

One end of cable 209 is secured to arm 180 in the manner heretofore described and the opposite end is secured to ring 210 (see FIG. 8). Spring 211 connects to ring 210 and bore 105; jumper cable 212 is slack and connects to ring 210 and bore 98 in arm 95, respectively. Rearward rotation of arm 180 first causes spring 221 to extend and jumper cable 212 to become taut; further rotation of arm 180 rearwardly applies a force on arm 95 whereby cross arm 94 pivots and pen 101 scribes an arc 213 as shown in FIG. 16 of the drawings. Such mark may be used to indicate reference points along a roadway undergoing evaluation whereby tape 36 may be correlated to a geographical landmark. Mark 214 is provided in like manner to indicate another reference.

Referring now to FIG. 15 of the drawings, there is shown a trace representing distance wherein each saw tooth pattern represents one-tenth mile; accordingly, the vehicle has traveled approximately .65 mile between marks 213, 214.

To determine the summation of road roughness between marks 213, 214 or any other selected distance, for example, the operator measures the horizontal distance, in inches, between the neutral points on the trace; in FIG. 16 of the drawings, the distance between marks 213, 214 is eight and one-quarter inches. Such measured distance is then multiplied by a predetermined factor determined primarily by the ratio of the diameters of sheave 45 relative to that of roller 49. In the embodiment of FIGS. 1–6, sheave 45 is seven inches in diameter while roller 49 is 1.75 inches in diameter, providing a four-to-one ratio. Furthermore, since the vehicle in which meter 20 is mounted always returns to its neutral position and roller 49 is operative only during one-half cycle, the result must then be doubled. Using such formula, approximately sixty-six inches of road roughness occurs between marks 213, 214.

In the embodiment of FIG. 9, the ratio of the approximate distance between the center of shaft 41 and bore 166 relative to the radius of roller 49 is to be used; a lever arm of three and one-half inches relative to a .875 inch radius for the roller gives a four-to-one ratio. Since roller 49 causes tape 36 to move to the left regardless of the movement of the vehicle, it is not necessary to double the result. Accordingly, the user merely multiplies the distance between selected points on the trace, in inches, by the ratio of the length of the lever arm through which cable 108 acts relative to the radius of roller 49 to obtain the summation of road roughness.

What is claimed is:

1. A road roughness meter comprising a housing, a platform mounted in said housing, a transversely extending shaft in said housing, a roller mounted on said shaft, a tape passing over said platform and said roller, at least one sheave, an indexing clutch consisting of a driving race and a driven race, said driving race secured to at least one sheave, said driven race secured to and adapted to index said shaft, indicating means providing a trace on said tape proportional to the frequency and amplitude of a force from an unsprung source applied to at least one sheave, and means to return at least one sheave to its neutral position.

2. The invention of claim 1 wherein said roller advances said tape.

3. The invention of claim 1 wherein said meter is mounted in a vehicle and the vertical relative movement of said vehicle activates said roller.

4. The invention of claim 1 including a second clutch, said second clutch consisting of a driving race and a driven race, said driving race held stationary, said driven race secured to said shaft whereby said shaft rotates in only one direction.

5. A road roughness meter mounted in a vehicle comprising a housing, a platform mounted in said housing, a transversely extending shaft in said housing, a roller mounted on said shaft, a tape passing over said platform and said roller, first and second sheaves, an indexing clutch consisting of a driving race and a driven race, said driving race secured to at least one sheave, said driven race secured to and adapted to index said shaft, indicating means providing a trace on said tape proportional to the frequency and amplitude of a force applied to said first sheave from an unsprung source, said second sheave connected to said indicating means, and means to return said first sheave to its neutral position.

6. The invention of claim 5 wherein said tape is advanced by said roller only upon vertical relative movement of said vehicle.

7. A road roughness meter mounted in the sprung portion of a vehicle and connected to the unsprung portion of said vehicle comprising a housing, a tape supply reel mounted in said housing, a platform mounted in said housing, a transversely extending shaft passing through said housing, a roller mounted on said shaft, said tape passed over said platform and said roller, a takeup reel for said tape in said housing, first and second sheaves, an indexing clutch consisting of an outer driving race and an inner driven race, said outer race secured to at least one of said sheaves, said driven race secured to and indexing said shaft, said roller advancing said tape, said shaft driving said takeup reel, means applying a force from said unsprung portion of said vehicle to said first sheave, means returning said first sheave to its neutral position, and indicating means connected to said second sheave providing a trace on said tape proportional to the frequency and amplitude of such applied force.

8. A roughness meter mounted in a vehicle including an odometer comprising a housing; a platform mounted in said housing, a transversely extending shaft in said housing, a roller mounted on said shaft, a tape passing over said platform and said roller, first and second sheaves, an indexing clutch consisting of a driving race and a driven race, said driving race secured to at least one of said sheaves, said driven race secured to and indexing said shaft, said roller advancing said tape, indicating means providing a trace on said tape proportional to the frequency and amplitude of an unsprung force applied to said first sheave, said second sheave connected to said indicating means, means to return said first sheave to its first position after each such force is applied to said first sheave, and means activated by said odometer providing an indication of distance on said tape.

9. The invention of claim 8 wherein said shaft rotates in only one direction.

References Cited

UNITED STATES PATENTS 3,266,302   8/1966   Spangler et al. ____ 73—146 XR
3,353,404   11/1967  Swift _____ 73—146

DONALD O. WOODIEL, Primary Examiner